United States Patent [19]

Pham et al.

[11] Patent Number: 4,968,906

[45] Date of Patent: Nov. 6, 1990

[54] CLOCK GENERATING CIRCUIT FOR ASYNCHRONOUS PULSES

[75] Inventors: Giao N. Pham, Vancouver, Wash.; Kenneth C. Schmitt, Colorado Springs, Colo.

[73] Assignee: NCR Corporation, Dayton, Ohio

[21] Appl. No.: 412,030

[22] Filed: Sep. 25, 1989

[51] Int. Cl.⁵ .................... H03K 17/16; H03K 19/003
[52] U.S. Cl. .................................. 307/480; 307/443;
307/261; 307/262; 307/269; 307/510; 307/518;
307/527; 307/529; 328/110; 328/133; 377/55;
377/111
[58] Field of Search ........................ 307/443, 546–547,
307/555, 557, 562, 261–262, 269, 271, 480,
510–511, 516, 518, 527, 529, 296.3;
328/109–110, 133; 377/55, 111

[56] References Cited

U.S. PATENT DOCUMENTS

| | | | |
|---|---|---|---|
| 3,310,660 | 3/1967 | Cogar | 235/92 |
| 3,327,226 | 11/1964 | Nourney | 328/109 |
| 3,560,859 | 6/1968 | Thompson | 328/44 |
| 3,704,361 | 11/1972 | Patterson | 235/92 |
| 4,075,464 | 2/1978 | Davies, Jr. | 328/44 |
| 4,109,209 | 8/1978 | Bismarck | 328/60 |
| 4,414,678 | 11/1983 | Baumgartner | 377/28 |
| 4,423,482 | 12/1983 | Hargrove et al. | 371/16 |
| 4,502,014 | 2/1985 | Bismarck | 328/110 |
| 4,694,426 | 9/1987 | Mason | 365/78 |
| 4,713,832 | 12/1987 | Hutson | 377/45 |
| 4,751,469 | 6/1988 | Nakagawa et al. | 328/110 |
| 4,759,044 | 7/1988 | Hövelmann | 377/125 |
| 4,894,565 | 1/1990 | Marquardt | 328/109 |

Primary Examiner—Stanley D. Miller
Assistant Examiner—Margaret Rose Wambach
Attorney, Agent, or Firm—Wilbert Hawk, Jr.; Stephen F. Jewett; Douglas S. Foote

[57] ABSTRACT

A circuit for generating clock and control signals from first and second asynchronous binary signals. The circuit generates first and second pulse signals responsive to the first and second asynchronous binary signals, a clock pulse signal responsive to the first or second pulse signal, and an identification control signal to indicate which of the two binary signals is responsible for the clock signal. The circuit is also responsive to the first and second pulse signals for generating an overlap control signal to indicate overlap in the first and second pulse signals.

29 Claims, 4 Drawing Sheets

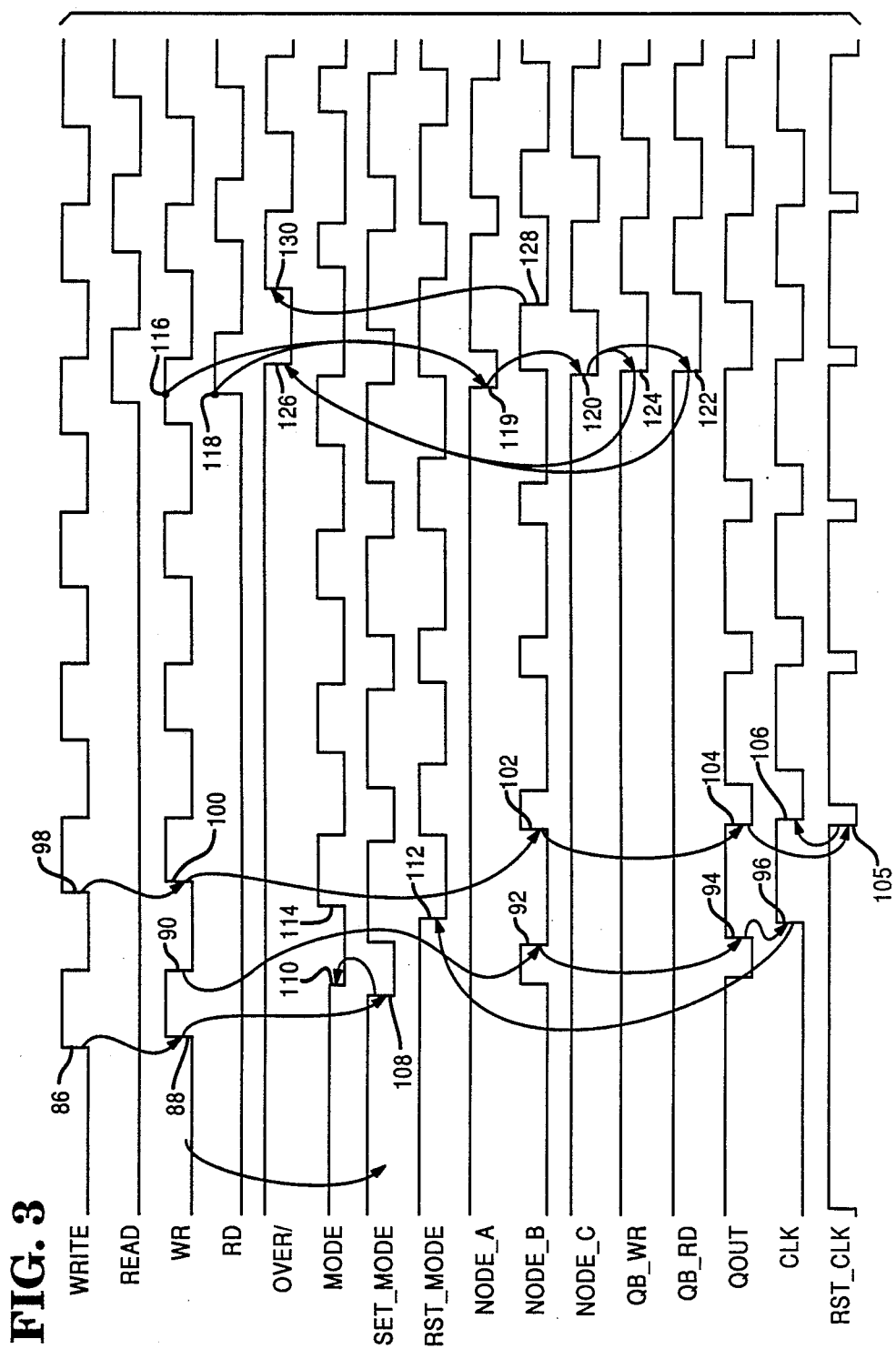

4,968,906

CLOCK GENERATING CIRCUIT FOR ASYNCHRONOUS PULSES

The present invention relates to pulse conditioning circuits, and, more particularly, to circuits for converting asynchronous pulse signals to signals which can be processed to yield a count of such asynchronous pulse signals.

BACKGROUND OF THE INVENTION

Microprocessors and input/output (I/O) devices often have different operating capabilities relative to their operating frequency. For example, a microprocessor may be capable of transferring data to or from an I/O device at a much faster rate than the I/O device can receive or transmit data. In order not to slow down the microprocessor, RAMs are frequently used as buffers or interface data storage elements between microprocessors and I/O devices. In this manner data can be transferred between the RAM and the microprocessor at one rate and between the RAM and I/O device at another rate.

A typical RAM used as an interface is a first-in first-out (FIFO) buffer in which data bytes are read out in the same order in which they are read into the FIFO. A dual-ported FIFO RAM allows data to be simultaneously read from and written to the buffer. Thus, a fast microprocessor can transfer data into the FIFO at its operating frequency, and a relatively slower I/O device can read the data at its operating frequency. In order to track the location of the next data byte to be read from or written to the FIFO, read and write address pointers are used. The write and read pointers are incremented on each FIFO access, and a byte count for the number of bytes of data in the FIFO is increased or decreased as the amount of data increases or decreases, respectively. The byte count is used by the microprocessor and/or I/O device to indicate when the FIFO should be read and when no more data should be transferred to the FIFO. For example, a fast microprocessor might wait until the FIFO is half full before reading data therefrom. However, no data can be read from an empty FIFO, nor should data be written into a full FIFO.

The read and write address pointers for the FIFO are controlled by the device requesting the read or write function and can therefore operate independently of each other. Independent operation is desirable to allow reading and writing of the FIFO to occur simultaneously, thereby improving the overall system operation. However, truly independent and asynchronous operation presents difficulties in keeping track of the FIFO byte count. For example, asynchronously occurring read and write pulses may operate at different frequencies, they may overlap, and they may have different pulse widths. Asynchronously occurring pulses can also create problems of metastability since the setup and hold times of the pulses are unpredictable.

OBJECTS OF THE INVENTION

It is therefore an object of the present invention to provide a new and improved circuit for converting asynchronous pulses to signals which can be processed to yield a count of the asynchronous pulses.

It is another object of the present invention to provide a circuit for converting asynchronous read and write signals to a FIFO buffer into signals which can be combined to provide a byte count for the buffer.

It is a further object of the present invention to provide a circuit for generating clock and control signals from two asynchronous binary signals.

It is yet another object of the present invention to provide a circuit for clocking two asynchronous signals without metastability.

SUMMARY OF THE INVENTION

The present invention is a circuit for generating clock and control signals from first and second asynchronous binary signals. The circuit comprises first means for generating first and second pulse signals responsive to the first and second asynchronous binary signals, second means for generating a clock pulse signal responsive to the first or second pulse signal, and third means for generating an identification control signal to indicate which of the two binary signals is responsible for the clock signal.

In another form the circuit further comprises fourth means responsive to the first and second pulse signals for generating an overlap control signal to indicate overlap in the first and second pulse signals.

BRIEF DESCRIPTION OF THE DRAWINGS

FIG. 3 is a timing diagram showing the operation of the circuit in FIGS. 1A and 1B.

DESCRIPTION OF A PREFERRED EMBODIMENT

Figure 1A:
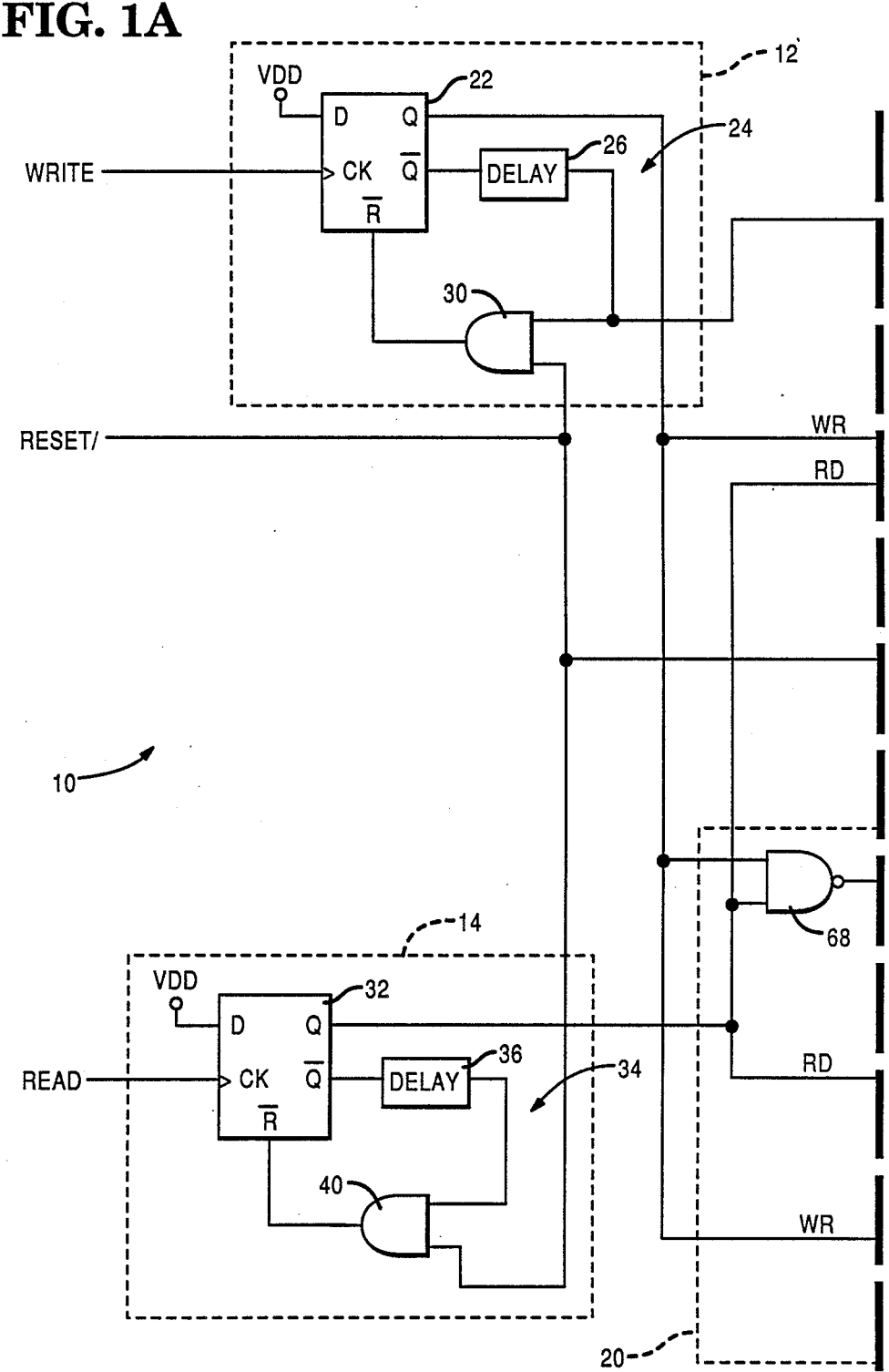
FIGS. 1A and 1B show a circuit diagram of one form of the present invention.
Figure 1B:
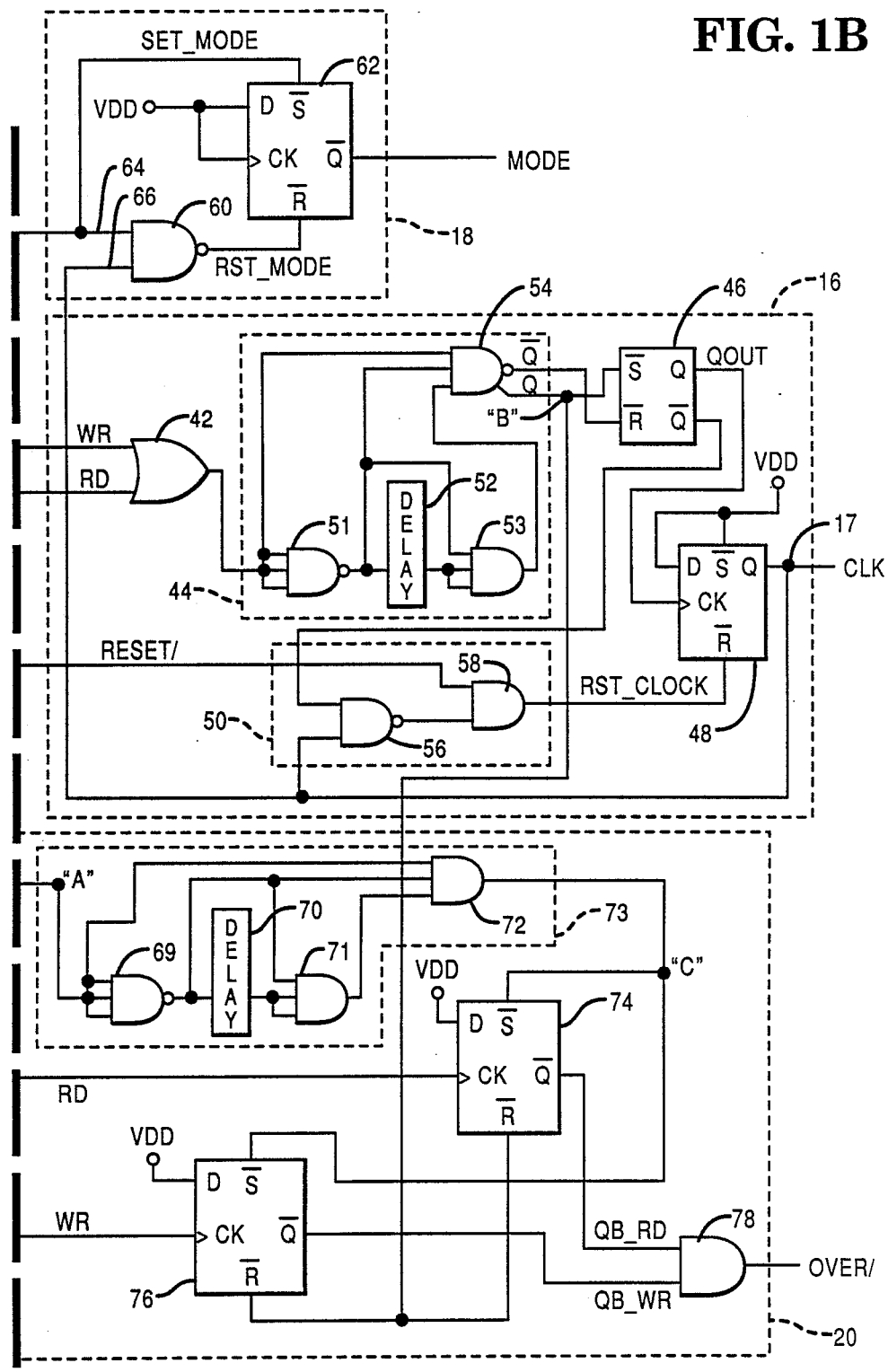

FIGS. 1A and 1B show a circuit 10 for generating a clock (CLK) signal and control (MODE and OVER/) signals from asynchronous binary signals (WRITE and READ). Circuit 10 includes shaping circuits 12 and 14. Shaping circuit 12 generates a write pulse (WR) signal responsive to the WRITE signal, and shaping circuit 14 generates a read pulse (RD) signal responsive to the READ signal. Circuit 10 also includes a clock generating circuit 16, a mode indicating circuit 18 and an overlap indicating circuit 20. Circuit 16 generates, at an output 17, a clock (CLK) pulse signal responsive to the WR or RD signal. Circuit 18 generates an identification (MODE) control signal to indicate which of the WR or RD signals is responsible for the clock (CLK) signal. Circuit 20 is responsive to the WR and RD signals and generates an overlap (OVER/) control signal to indicate overlap in the WR and RD signals.

Shaping circuit 12 includes a D-type flip-flop 22 and a feedback loop 24 having a delaying circuit 26 and a coincidence gate in the form of two input AND gate 30. Flip-flop 22 has data (D), clock (CK), and reset (R/) inputs, a Q output, and inverted (Q/) output. The D input is connected to a reference potential terminal VDD and the CK input receives the WRITE signal. The WR signal is provided on the Q output and an inverted WR signal is provided on the Q/ output. Feedback loop 24 is connected between the Q/ output and R/ input of flip-flop 22, and delaying circuit 26 and AND gate 30 are series connected therebetween. The input of delaying circuit 26 is connected to the Q/ output of flip-flop 22 and the output of delaying circuit 26 is connected to one of the inputs of AND gate 30 with the other AND gate input receiving an externally generated reset signal RESET/. The output of AND gate 30 is connected to the R/ input of flip-flop 22.

Similarly, shaping circuit 14 includes a D-type flip-flop 32 and a feedback loop 34 having a delaying circuit 36 and a coincidence gate in the form of two input AND gate 40. Flip-flop 32 has data (D), clock (CK), and reset (R/) inputs, a Q output, and inverted (Q/) output. The D input is connected to a reference potential terminal VDD and the CK input receives the READ signal. The RD signal is provided on the Q output and an inverted RD signal is provided on the Q/ output. Feedback loop 34 is connected between the Q/ output and R/ input of flip-flop 32, and delaying circuit 36 and AND gate 40 are series connected therebetween. The input of delaying circuit 36 is connected to the Q/ output of flip-flop 32 and the output of delaying circuit 36 is connected to one of the inputs of AND gate 40 with the other AND gate input receiving the externally generated reset signal RESET/. The output of AND gate 40 is connected to the R/ input of flip-flop 32.

Clock generating circuit 16 includes a two input OR gate 42, a pulse shaping circuit 44, an SR latch 46, a clocked SR latch 48 and a reset circuit 50. Latch 46 has set (S/) and reset (R/) inputs, and a Q output and inverted (Q/) output. Clocked SR latch 48 has data (D), clock (CK), set (S/) and reset (R/) inputs and a Q output, with the D and S/ inputs connected to a common reference potential terminal VDD. The inputs of OR gate 42 are connected to the Q outputs of flip-flops 22 and 32, respectively, thereby receiving the WR and RD signals. Pulse shaping circuit 44, latch 46 and latch 48 are series connected between the output of OR gate 42 and output 17 of circuit 16. Pulse shaping circuit 44 includes a three input NAND gate 51, a delaying circuit 52, a three input AND gate 53, and a three input NAND gate 54. The three inputs of NAND gate 51 are connected to the output of OR gate 42, the input of delaying circuit 52 is connected to the output of NAND gate 51, two inputs of AND gate 53 are connected to the output of delaying circuit 52 and a third input of AND gate 53 is connected to the output of NAND gate 51, and the inputs of NAND gate 54 are connected to the outputs of OR gate 42, NAND gate 51 and NAND gate 53, respectively. NAND gate 54 provides both a Q output and inverted (Q/) output. The Q output of NAND gate 54 is connected to the S/ input of latch 46 and the Q/ output of NAND gate 54 is connected to the R/ input of latch 46. The Q output of latch 46 is connected to the CK input of latch 48 and provides a QOUT signal thereto. The Q output of latch 48 provides the CLK signal.

Reset circuit 50 includes a two input NAND gate 56 and a two input AND gate 58. One input of NAND gate 56 is connected to the Q/ output of latch 46, and the other input of NAND gate 56 is connected to the Q output 17 of latch 48 for receiving the CLK signal therefrom. One input of AND gate 58 receives the externally generated reset signal RESET/, and the other input of AND gate 58 is connected to the output of NAND gate 56. The output of AND gate 58 is connected to the R/ input of latch 48 and provides a $RST_{13}$ CLOCK signal thereto.

Mode indicating circuit 18 includes a two input NAND gate 60 and an SR latch 62. SR latch 62 has set (S/), reset (R/), data (D) and clock (CK) inputs, and an inverted (Q/) output. The D and CK inputs of latch 62 are connected to a common reference potential terminal VDD. NAND gate 60 has inputs 64 and 66. Input 64 of NAND gate 62 is connected to the output of delay circuit 26 in shaping circuit 12. Input 66 of NAND gate 60 is connected to output 17 of latch 48 and receives the CLK signal therefrom. The output of NAND gate 60 is connected to the R/ input of latch 62 and provides a RST_MODE signal thereto. NAND gate input 64 is also connected to the S/ input of latch 62 and provides a $SET_{13}$ MODE signal thereto. The MODE signal is provided by the inverted output Q/ of latch 62.

Overlap indicating circuit 20 includes a NAND gate 68, a pulse shaping circuit 73, AND gate 78, and clocked SR latches 74 and 76. One input of NAND gate 68 is connected to the Q output of latch 22 and receives the WR signal therefrom. The other input of NAND gate 68 is connected to the Q output of latch 32 and receives the RD signal therefrom. Pulse shaping circuit 73 includes a three input AND gates 69, 71 and 72 and a delaying circuit 70. The three inputs of AND gate 69 are connected to the output of NAND gate 68, the input of delaying circuit 70 is connected to the output of AND gate 69, two inputs of AND gate 71 are connected to the output of delaying circuit 70 and a third input of AND gate 71 is connected to the output of AND gate 69, and the inputs of AND gate 72 are connected to the outputs of NAND gate 68 and AND gates 69 and 71, respectively. Each latch 74 and 76 has data (D), clock (CK), set (S/) and reset (R/) inputs and an inverted (Q/) output. The output of AND gate 72 is connected to the S/ inputs of latches 74 and 76. The D inputs of latches 74 and 76 are connected to a reference potential terminal VDD, and the R/ inputs are connected to the Q output of NAND gate 54. The CK input of latch 74 is connected to the Q output of flip-flop 32 and receives the RD signal therefrom. The CK input of latch 76 is connected to the Q output of flip-flop 22 and receives the WR signal therefrom. The Q/ outputs of latches 74 and 76 are connected to respective inputs of AND gate 78 and provide $QB_{13}$ RD and QB_WR signals, respectively, thereto. The output of AND gate 78 provides the OVER/ signal.

Figure 2:
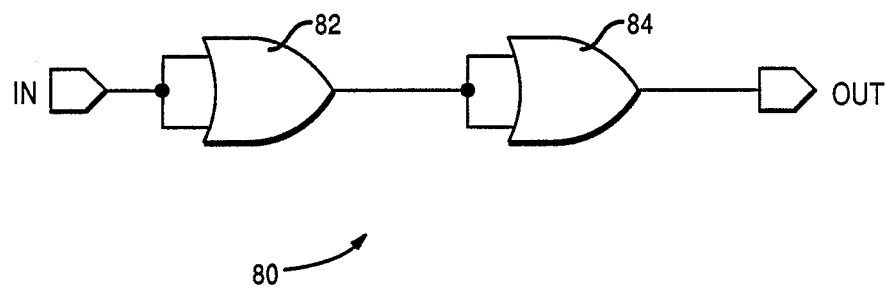
FIG. 2 is a circuit diagram of a delaying circuit such as may be employed in the circuit shown in FIGS. 1A and 1B.

FIG. 2 illustrates a delaying circuit 80 such as may be employed for delaying circuit 52 or 70 shown in FIG. 1B. Circuit 80 includes series connected OR gates 82 and 84. The inputs of OR gate 82 are connected and receive an input signal. The inputs of OR gate 84 are connected to the output of OR gate 82. A delayed signal is provided by the output of OR gate 84. Each OR gate introduces a delay in the transmission of a signal appearing on its inputs. More OR gates may be cascaded in order to increase the delay time. For example, delay circuits 26 and 36, shown in FIG. 1A, may require an increased delay time as illustrated hereinafter.

The operation of circuit 10 is best understood by reference to the timing diagram shown in FIG. 3. The signals shown in FIG. 3 are also labeled in FIG. 1 and reference will be made to FIG. 1 in the following discussion. Consider first the case where only a WRITE signal is received by circuit 10. The rising edge 86 of a WRITE signal causes the WR signal to go high at rising edge 88. The Q/ output of latch 22 will go low when the WR signal from the Q output goes high. The low Q/ output will reset latch 22 after a propagation delay introduced by delaying circuit 26 and AND gate 30. This propagation delay defines the duration of the WR pulse since the resetting of latch 22 will drive WR low at falling edge 90. As long as WR is high, the output of OR gate 42 is high. However, when WR goes low, the Q output of OR gate 42 also goes low and the Q output of NAND gate 54 (as illustrated by the NODE_B signal) goes low at falling edge 92. This sets latch 46, and the Q output (as illustrated by the QOUT signal) goes high at rising edge 94. QOUT is received by flip-flop 48 on its CK input and the output signal CLK goes high at rising edge 96. CLK will stay high until shortly after circuit 10 receives the next WRITE signal. The rising edge 98 of this next WRITE signal drives the WR signal high, as shown by rising edge 100. The output of OR gate 42 goes high, but the NODE_B signal only goes high (shown by rising edge 102) after a time delay introduced by pulse shaping circuit 44. When NODE_B goes high, the Q/ output of NAND gate 54 goes low and resets latch 46 by driving the QOUT signal low at falling edge 104. The signal from the Q/ output of latch 46 (which is the inverse of QOUT) goes high and is received by reset circuit 50 which produces a low RST_CLK signal at falling edge 105. This drives CLK low at falling edge 106.

In a similar manner (not illustrated) receipt solely of READ pulses by circuit 10 will produce CLK pulses. Shaping circuit 14 generates RD pulses in response to the READ pulses. The falling edge of the RD pulse will, as with the falling edge of a WR pulse, stimulate a rising edge on the CLK signal. The CLK signal will fall in response to the receipt of the next READ or WRITE signal.

The MODE signal indicates whether the WRITE or READ signal is responsible for the CLK signal. As indicated previously, one application for circuit 10 is to provide a signal to an up/down counter (not shown) for counting the number of bytes of data in a FIFO, as data is read from or written to the FIFO. In such application the CLK signal increments or decrements the counter depending upon the value of the MODE signal. For example, if the MODE signal is low when the CLK signal goes high, this indicates that a WRITE signal caused the CLK signal and the counter will increment. The MODE signal will be high for a READ signal and the counter will decrement upon receipt of the CLK signal.

Reference is again made to FIG. 3 and FIGS. 1A and 1B. It should be noted that the MODE signal will be undefined after circuit 10 has received a RESET/ signal. Rising edge 88 on the WR signal will drive SET_MODE low at falling edge 108 after the delay introduced by delaying circuit 26. Falling edge 108 on the SET_MODE signal will drive the MODE signal (Q/ output) of latch 62 low at falling edge 110. The MODE signal will remain low until after the rising edge 96 on the CLK signal. Thus, when the CLK signal goes high, MODE will be low thereby indicating that the CLK signal was caused by a WRITE signal. However, rising edge 96 of the CLK signal is received by NAND gate 60 the output of which is the RST_MODE signal which responds by going low at falling edge 112. This resets the MODE signal (Q/ output of latch 62) high at rising edge 114. Once the MODE signal has been reset high, it will remain high until set low by another WRITE signal. Thus, if READ signals are received by circuit 10 thereby generating CLK signals, the high MODE signal will indicate that the CLK signals are caused by the READ signals.

The operation of overlap indicating circuit 20 will now be described. The overlap signal OVER/ is an active low signal indicating that both a WRITE and READ signal have been received. Rather than attempt to both increment and decrement a counter in response to the WRITE and READ signals, the OVER/ signal will disable the counter receiving the CLK signal thereby achieving the same result. As long as only a READ or WRITE signal is received by circuit 10, OVER/ will be inactive high. However, when both the WR and RD signal are high, as indicated at 116 and 118, NODE_A will go low at falling edge 119 and NODE$_{13}$ C will go low at falling edge 120 after a delay introduced by AND gate 72. Note that both the RD and WR signals are received by the CK input of latches 74 and 76, respectively. If both the RD and WR signals are still high when the NODE$_{13}$ C signal goes low, latches 74 and 76 will be set and the QB_RD and QB_WR will go low at falling edges 122 and 124, respectively. The OVER/ signal then goes low at falling edge 126 thereby indicating overlap between the RD and WR signals. When both the RD and WR signals goes low, the NODE_B signal will go low at falling edge 128 which resets latches 74 and 76 driving OVER/ high at rising edge 130.

The RD and WR signals being inputs to the CK input ports of latches 74 and 76, respectively, ensure that overlap indicating circuit 20 will generate an OVER/ signal for RD and WR pulses that just slightly overlap. For example, if the RD signal goes low at about the same time the WR signal goes high, the delays in NAND gate 68 will not allow NODE_A to go low which would otherwise prevent an overlap signal OVER/ from being generated. However, since WR is connected to the CK input of latch 76, when WR goes high, latch 76 will clock and QB_WR will go low generating an OVER/ signal. It should be noted that the R/ input of latches 76 and 74 will be high due to the RD pulse being high, so that slightly overlapping RD and WR signals will not be lost.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

What is claimed:

1. A circuit for generating clock and control signals from first and second asynchronous binary signals, comprising:
    first means for generating first and second pulse signals responsive to said first and second asynchronous binary signals;
    second means connected to said first means for generating a clock pulse signal responsive to said first or second pulse signal; and
    third means connected to said first and second means for generating an identification control signal to indicate which of said first or second binary signals is first received by said circuit.

2. The circuit of claim 1, further comprising:
    fourth means connected to said first and second means responsive to said first and second pulse signals for generating an overlap control signal to indicate overlap in the first and second pulse signals.

3. The circuit of claim 1 wherein said first means includes:
    a first D-type flip-flop for receiving said first asynchronous binary signal on an input thereof and for providing said first pulse signal on an output thereof; and a second D-type flip-flop for receiving said second asynchronous binary signal on an input thereof and for providing said second pulse signal on an output thereof.

4. The circuit of claim 3 wherein said first means further includes:

a first feedback loop connected between an inverted output and a reset input of said first flip-flop; and a second feedback loop connected between an inverted output and a reset input of said second flip-flop.

5. The circuit of claim 4 wherein each of said first and second feedback loops includes a delaying circuit series connected with a coincidence gate.

6. The circuit of claim 5 wherein said coincidence gates are two input AND gates each having an input for receiving an externally generated reset signal and another input connected to an output of its respective delaying circuit.

7. The circuit of claim 6 wherein said externally generated reset signal is an active low signal.

8. The circuit of claim 1 wherein said second means includes:

a two input OR gate for receiving said first and second pulse signals; and a pulse shaping circuit, SR latch, and a clocked SR latch series connected between the output of said OR gate and an output of said second means which provides said clock signal.

9. The circuit of claim 8 wherein said pulse shaping circuit is effective for transferring a low going signal from the OR gate output directly to said SR type latch and for delaying the transfer of a high going signal from the OR gate output to said SR latch.

10. The circuit of claim 9 wherein said pulse shaping circuit includes:

a first AND gate having an output and having inputs connected to the output of said OR gate;

a delaying circuit having an input connected to the output of said first AND gate and having an output;

a second AND gate having inputs connected to the outputs of said first AND gate and said delaying circuit; and a third AND gate having inputs connected to the OR gate output and the outputs of said first and second AND gates, respectively, and having an output connected to a set input of said SR latch, and having an inverted output connected to a reset input of said SR latch.

11. The circuit of claim 8 wherein said second means further includes:

a reset circuit having a first input connected to an inverted output of said SR latch, and second and third inputs for receiving said clock signal and an externally generated reset signal, respectively, said reset circuit further having an output connected to a reset input of said clocked SR latch.

12. The circuit of claim 11 wherein said reset circuit includes:

a two input NAND gate and a two input AND gate, with said first and second inputs connected to the inputs of said NAND gate, said third input and the output of said NAND gate connected to the inputs of said AND gate, and the output of said AND gate connected to the reset input of said clocked SR latch.

13. The circuit of claim 1 wherein said third means includes:

a two input NAND gate and an SR latch with a first input of said NAND gate connected to said first means and a second input receiving said clock signal, the output of said NAND gate connected to the reset input of said SR latch and said first input connected to the set input of said SR latch.

14. The circuit of claim 13 wherein said identification control signal is provided by an inverted output of said SR latch.

15. The circuit of claim 14 wherein the first input of said NAND gate receives a delayed and inverted version of said first pulse signal.

16. The circuit of claim 2 wherein said fourth means includes:

a NAND gate for receiving said first and second pulse signals;

a pulse shaping circuit having an input connected to the output of said NAND gate;

first and second clocked SR latches, each having a set input connected to the output of said pulse shaping circuit; and a first AND gate having inputs connected to inverted outputs of said first and second latches and providing said overlap control signal at an output thereof.

17. The circuit of claim 16 wherein said pulse shaping circuit includes:

a second AND gate having inputs connected to the output of said NAND gate;

a delaying circuit having an input connected to the output of said second AND gate;

a third AND gate connected to outputs of said delaying circuit and said second AND gate; and a fourth AND gate having inputs connected to outputs of said NAND gate and said second and third AND gates, respectively.

18. The circuit of claim 16 wherein the clock input of said first latch receives said first pulse signal and the clock input of said second latch receives said second pulse signal.

19. The circuit of claim 18 further comprising:

an OR gate for receiving said first and second pulse signals;

a delaying circuit having an input connected to the output of said OR gate; and a second AND gate having two inputs connected to the output of said OR gate and said delayed output, respectively, and having an output connected to a reset input on each of said first and second latches.

20. A circuit for generating clock and control signals from first and second asynchronous binary signals, comprising:

first means for generating first and second pulse signals responsive to said first and second asynchronous binary signals;

second means connected to said first means for generating a clock pulse signal responsive to said first or second pulse signal, said second means including:

a two input OR gate for receiving said first and second pulse signals;

a first pulse shaping circuit, a first SR latch, and a first clocked SR latch series connected between the output of said OR gate and an output which provides said clock signal; and a reset circuit having a first input connected to an inverted output of said first SR latch, and second and third inputs for receiving said clock signal and an externally generated reset signal, respectively, said reset circuit further having an output connected to a reset input of said first clocked SR latch;

third means connected to said first and second means for generating an identification control signal to indicate which of said first or second binary signals is first received by said circuit; and fourth means connected to said first and second means responsive to said first and second pulse signals for generating an overlap control signal to indicate overlap in the first and second pulse signals.

21. The circuit of claim 20 wherein said first means includes:
  a first D-type flip-flop for receiving said first asynchronous binary signal on an input thereof and for providing said first pulse signal on an output thereof; and
  a second D-type flip-flop for receiving said second asynchronous binary signal on an input thereof and for providing said second pulse signal on an output thereof.

22. The circuit of claim 21 wherein said third means includes:
  a first NAND gate and a second SR latch, with a first input of said NAND gate connected to said first means and a second input receiving said clock signal, the output of said NAND gate connected to the reset input of said second SR latch, and the first input of said NAND gate connected to the set input of said second SR latch.

23. The circuit of claim 22 wherein said fourth means includes:
  a second NAND gate for receiving said first and second pulse signals;
  a second pulse shaping circuit having an input connected to the output of said second NAND gate;
  second and third clocked SR latches each having a set input connected to the output of said second pulse shaping circuit; and
  a first AND gate having inputs connected to inverted outputs of said second and third clocked SR latches and providing said overlap control signal at an output thereof.

24. The circuit of claim 23 wherein said second pulse shaping circuit includes:
  a second AND gate having inputs connected to the output of said second NAND gate;
  a delaying circuit having an input connected to the output of said second AND gate;
  a third AND gate connected to outputs of said delaying circuit and said second AND gate; and
  a fourth AND gate having inputs connected to outputs of said NAND gate and said second and third AND gates, respectively.

25. The circuit of claim 23 wherein said first means further includes:
  a first feedback loop connected between an inverted output and a reset input of said first flip-flop; and
  a second feedback loop connected between an inverted output and a reset input of said second flip-flop;
  wherein said first feedback loop includes a first delaying circuit series connected with a second AND gate and said second feedback loop includes a second delaying circuit series connected with a third AND gate;
  wherein each of said first and second feedback loops includes a delaying circuit series connected with a coincidence gate; and
  wherein each of said second and third AND gates has an input for receiving an externally generated reset signal and another input connected to an output of its respective delaying circuit.

26. The circuit of claim 25 wherein said first pulse shaping circuit of said second means includes:
  a fourth AND gate having inputs connected to the output of said OR gate;
  a third delaying circuit having an input connected to the output of said fourth AND gate and having an output;
  a fifth AND gate having inputs connected to the outputs of said fourth AND gate and said third delaying circuit; and
  a sixth AND gate having inputs connected to the OR gate output and the outputs of said fourth and fifth AND gates, respectively, and having an output connected to a set input of said first SR latch, and having an inverted output connected to a reset input of said first SR latch.

27. The circuit of claim 26 wherein said reset circuit of said second means includes:
  a third NAND gate and a seventh AND gate, with the first and second inputs of said reset circuit connected to the inputs of said third NAND gate, said third input of said reset circuit and the output of said third NAND gate connected to the inputs of said seventh AND gate, and the output of said seventh AND gate connected to the reset input of said first clocked SR latch.

28. The circuit of claim 27 wherein said identification control signal is provided by an inverted output of said second SR latch, and wherein the first input of said first NAND gate is connected to the output of the delaying circuit in said first feedback loop.

29. The circuit of claim 28 wherein the clock input of said second clocked SR latch receives said first pulse signal and the clock input of said third clocked SR latch receives said second pulse signal, and wherein the output of said first pulse shaping circuit is connected to a reset input on each of said second and third clocked SR latches.

* * * * *